United States Patent

Capowski et al.

[15] 3,699,530

[45] Oct. 17, 1972

[54] INPUT/OUTPUT SYSTEM WITH DEDICATED CHANNEL BUFFERING

[72] Inventors: Robert S. Capowski, Wappingers Falls; Robert M. Unterberger, Poughkeepsie, both of N.Y.; Larry R. Horsman, Louisville, Colo.

[73] Assignee: International Business Machines Corporation, Armonk, N.Y.

[22] Filed: Dec. 30, 1970

[21] Appl. No.: 102,577

[52] U.S. Cl. ............................................340/172.5

[51] Int. Cl. ............................................G06f 9/18

[58] Field of Search ..................................340/172.5

[56] References Cited

UNITED STATES PATENTS

| | | | |
|---|---|---|---|
| 3,200,380 | 8/1965 | MacDonald et al. | 340/172.5 |
| 3,210,733 | 10/1965 | Terzian et al. | 340/172.5 |
| 3,274,554 | 9/1966 | Hopper et al. | 340/172.5 |
| 3,274,561 | 9/1966 | Hallman et al. | 340/172.5 |
| 3,449,723 | 6/1969 | Anderson et al. | 340/172.5 |
| 3,482,265 | 12/1969 | Cohen et al. | 340/172.5 |
| 3,483,522 | 12/1969 | Figueroa et al. | 340/172.5 |
| 3,530,438 | 9/1970 | Mellen et al. | 340/172.5 |

*Primary Examiner*—Gareth D. Shaw
*Assistant Examiner*—Sydney R. Chirlin
*Attorney*—Hanifin and Jancin and Owen L. Lamb

[57] ABSTRACT

A storage control unit (SCU) for a data processing system which buffers data fetch and data store requests from input/output channels for access to low-speed high-capacity interleaved logical storage units. Multiple dedicated buffers are provided for each channel in the storage control unit (SCU) to insure that all channels have an individual receptacle to transfer data to which cannot be made unavailable due to transfers by other channels. Priority resolution of requests from channels controls the use of the in bus from the channel to the SCU independently of subsequent priority resolution for use of the main storage. Once a channel transfers its storage address and data into its assigned SCU buffer, that buffer, based on the storage address contained within it, enters storage priority for the particular logical storage unit desired. In this manner, the single queue of channel requests is rearranged into four independent request queues based on logical storage addresses.

9 Claims, 11 Drawing Figures

INVENTORS
ROBERT S. CAPOWSKI
LARRY R. HORSMAN
ROBERT M. UNTERBERGER

BY Owen Lamb
ATTORNEY

INPUT/OUTPUT SYSTEM WITH DEDICATED CHANNEL BUFFERING

BACKGROUND OF THE INVENTION

1. Field of the Invention

This invention relates to a data processing system and more particularly to apparatus for controlling data flow between the input/output and the storage of the system.

2. Description of the Prior Art

In large scale data processing systems, smoothing of data requests between input/output channels of the system and the main storage of the system is accomplished by buffering. For example, in large systems, a data exchange is provided comprising a plurality of registers which form a queue of requesting signals. An input/output priority control transfers requests to one of the registers in the queue, and an output priority control selectively processes the stored request. This system has the advantage that it no longer is the availability of a storage cycle that determines whether or not a given device is serviced, but rather the availability of a queue position. This type of data exchange is necessary when many I/O channels are in contention for the use of the very slow memory. However, this technique is very expensive and when a relatively faster memory is utilized, the highly sophisticated buffering and priority techniques are not necessary.

As an alternative, a storage control unit (SCU) is provided between channels and memory. In existing systems, the SCU accepts a channel request to access a storage unit only when the inbound bus and an SCU channel buffer are both available. Accepted requests are then allowed to access the desired logical storage unit on a first in/first out basis or according to some other fixed priority scheme. However, an accepted request may still not be able to access the required logical storage if the logical storage is busy or if the unit is not busy but a request in another buffer has a higher priority and its required logical storage unit is busy. Thus, requests from a channel to a logical storage which is not busy can be held up because a request from a higher priority channel to a different logical storage has not been processed.

Should all buffers filled up by requests be unable to access their required logical storages due to the two cases above, no other channel request may be accepted by the SCU. This needlessly delays channel access to non-busy storage units and ties up the SCU buffers longer than is necessary, to the detriment of the lower priority channels. Increasing the number of shared SCU channel buffers benefits only the high priority channels because more buffering is available to them, however, this does not ease the contention problem faced by lower priority channels.

SUMMARY OF THE INVENTION

The primary object of this invention is to provide a simplified and improved buffering system for buffering requests from input/output channels to main memory.

Another object of this invention is to provide an improved priority control which resolves in parallel a large number of requests by many contenders for a large number of facilities.

A further object of this invention is to provide a sequence monitor which controls the loading and unloading of a plurality of buffers such that the loading is done as the buffers become available, and the unloading is done on a first in/first out basis.

Briefly, the above objects are accomplished in accordance with the invention by providing multiple dedicated buffers for each channel in the storage control unit (SCU) to insure that all channels have an individual receptacle to transfer data to which cannot be made unavailable due to transfers by other channels. Priority resolution of requests from channels controls the use of the in bus from the channel to the SCU independently of subsequent priority resolution for use of the main storage. Once a channel transfers its storage address and data into its assigned SCU buffer, that buffer, based on the storage address contained within it, enters storage priority for the particular logical storage unit desired. In this manner, the single queue of channel requests is rearranged into four independent request queues based on logical storage addresses. This results in the ability to concurrently cycle all logical storages in behalf of channel requests.

A further aspect of the invention involves the use of a sequence monitor to control the loading of individual buffers as they become available, and the unloading in the same sequence as the loading, i.e., on a first in/first out basis.

A still further aspect of the invention involves the use of a priority circuit which resolves multiple requests to multiple logical storages in accordance with a fixed priority taking into consideration the availability of each storage and contention to that storage only for purposes of priority determination.

The dedicated buffering system has the advantage that it eliminates unnecessary interference of lower priority channel requests by higher priority channels concurrently requesting at high speed data rates. This allows the lower priority channels to sustain higher I/O rates than would otherwise be possible.

Multiple dedicated buffers per channel allow concurrent storage cycles to be taken in behalf of individual channels which have the capability to overlap their requests. If only one buffer were dedicated to such a channel, only until after one request was completed and the buffer made available could the next request be handled. The multiple buffers per channel effectively enables doubling the I/O rates sustainable at each priority position.

The invention has the further advantage that a channel request can be accepted by the storage control unit provided only that the inbound bus is not busy and no other request of higher priority is pending. This allows the channel to unload its internal buffers faster and enables it to maintain higher data rates without severe data overrun exposures.

Storage control unit service priority assigned to the channel is more efficient since accepted requests accessing the same non-busy storage unit are processed not on a first in/first out basis but according to channel positions.

Furthermore, storage units can be accessed as soon as they become available and units required by accepted channel requests can be cycled concurrently to compensate for their longer access time. This is particularly advantageous to channels which can overlap storage requests since the logical units required by the overlapped request may be cycled concurrently.

The foregoing and other objects, features and advantages of the invention will be apparent from the following more particular description of the preferred embodiments of the invention as illustrated in the accompanying drawings.

GENERAL DESCRIPTION

Figure 1:
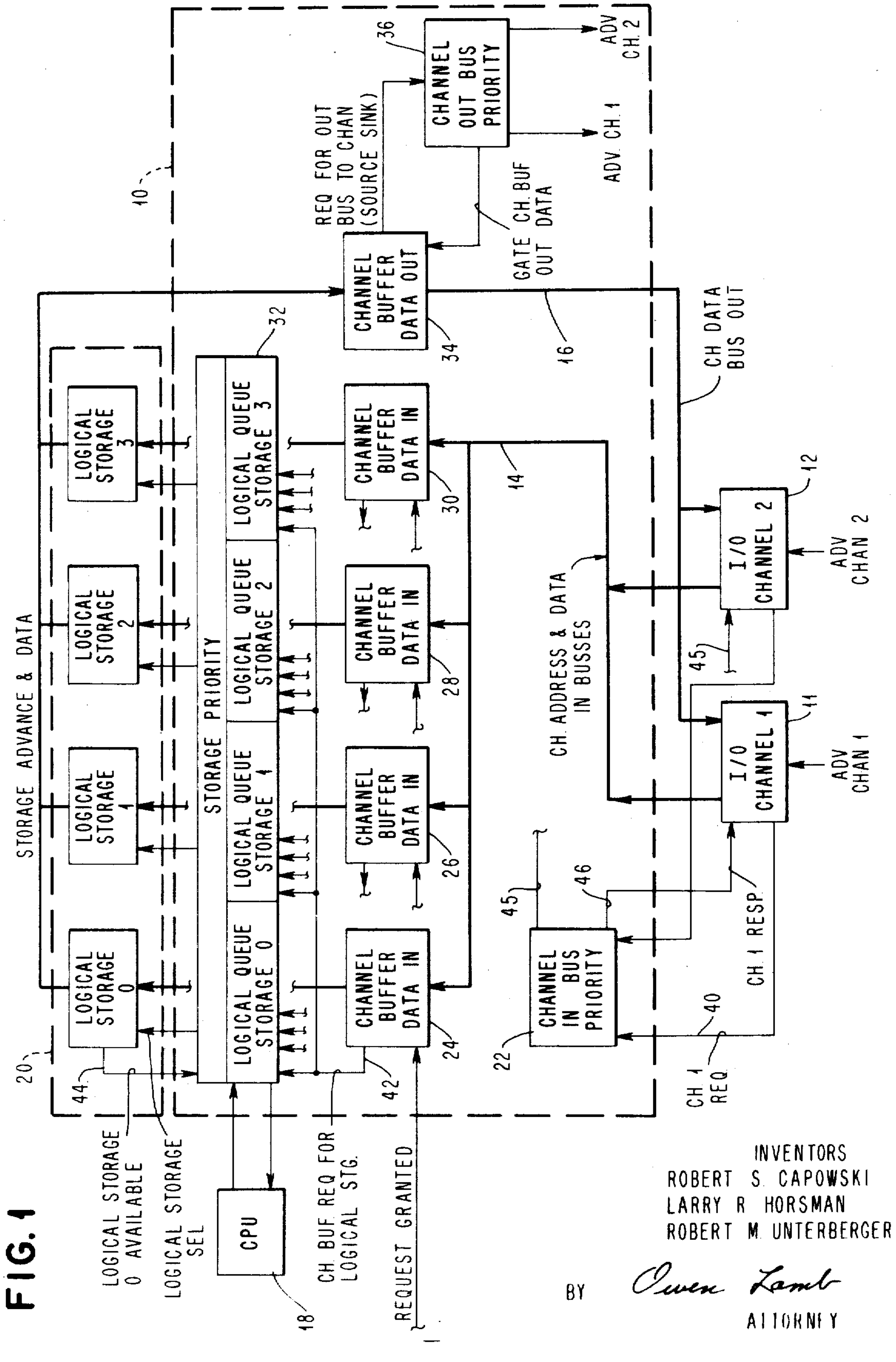
FIG. 1 is a block diagram of a computer system in which the invention is embodied.

Referring to FIG. 1, the data processing system in which the invention is embodied is comprised of a storage control unit 10 which is connected to channels 11 and 12 over shared channel busses, channel address and data in bus 14 and channel data bus out 16; a central processing unit 18 and a main interleaved storage 20. The storage control unit is comprised of a channel in bus priority circuit 22 for granting access by one of the channels 11, 12 to the in bus 14; a plurality of data in channel buffers 24, 26, 28, 30; a storage priority circuit 32 for organizing storage requests into logical queues for each of the logical storages 0 – 3 of the main memory 20; a channel data out buffer 34 for buffering data to the channels 11, 12; and a channel out bus priority 36 for granting access to the common channel data bus out 16.

The I/O channels 11, 12 communicate with the storage control unit via the shared channel busses 14 and 16. In addition to the main shared busses for information flow, there is provided channel-SCU control lines as an interface between the channels and the storage control unit. The interface includes the channel request lines 40, 42; channel response lines 44, 46; and the advance channel lines 48, 50. It should be understood that other control lines are necessary in such a system and a more complete description of typical controls can be found in the Boland, et al., U.S. Pat. application Ser. No. 776,859 — Memory System — filed Nov. 14, 1968.

To gain access to storage 20, one of the channels 11, 12 raises a channel request line 40. The channel in bus priority circuit 22 responds to the request line and grants the highest priority channel access to the common channel address and data in bus 14 while shutting out all lower priority channels. The channel granted priority is immediately responded to by the channel in bus priority circuit 22 raising the appropriate channel response line 45, 46. The channel granted priority then places the desired memory address and data (if a transfer to memory) on the bus 14. The address and data and other control information are placed in a dedicated buffer for the channel granted priority. The dedicated buffers are not shown in FIG. 1 as they are actually physically organized. Instead, the buffers 24, 26, 28, 30 are shown rearranged into logical buffer queues for the storage. This rearrangement is done logically in the manner by which the storage priority circuits 32 grant priority to a channel buffer request for logical storage 42. Briefly, logical storage requests are granted on the basis of priority among only those channels which are competing for the same logical storage. The request is granted when the logical storage becomes available and the logical storage available line 44 is utilized for this purpose by the priority circuit 32.

Once a channel request has gained access to a logical storage, the data is transferred from the logical buffer (for example, 24) to the logical storage (for example, logical storage 0).

When data transfer is from storage to the channel, the data stored in the logical storage requested is transferred to a channel buffer 34 which buffers the output data. The sequence of requests received at the dedicated buffers is maintained in correct order by a unique sequence monitor circuit (not shown in FIG. 1) which unloads channel buffer data out 34 in the same sequence that the requests from a particular channel were received. The output from the channel buffer 34 is controlled by the channel out bus priority 36.

Two buffers 0 and 1, referred to as a buffer group, are allocated to each channel. The buffer is split into a data in portion and a data out portion. The data in portion stores data to be stored in memory and address information along with control information. The data out portion stores data read from memory and corresponding controls. Thus, each channel is allocated one buffer group, consisting of two sections in the channel in buffers and two corresponding sections in the channel out buffers. Having multiple sections allows the storage control unit to accept multiple requests from each individual channel.

A sequence control circuit is provided to control the four dedicated buffer sections for each channel, i.e., the two buffer sections per channel for inbound and the two buffer sections per channel for outbound data. The monitor directs the in gating of requests into dedicated buffer sections as they become available but prevents channels from overrunning the assigned buffers when both sections are full. The sequence monitor insures that a channel receives storage information corresponding to requests in the same sequence that the channel initiated the requests.

DETAILED DESCRIPTION

Figure 2:
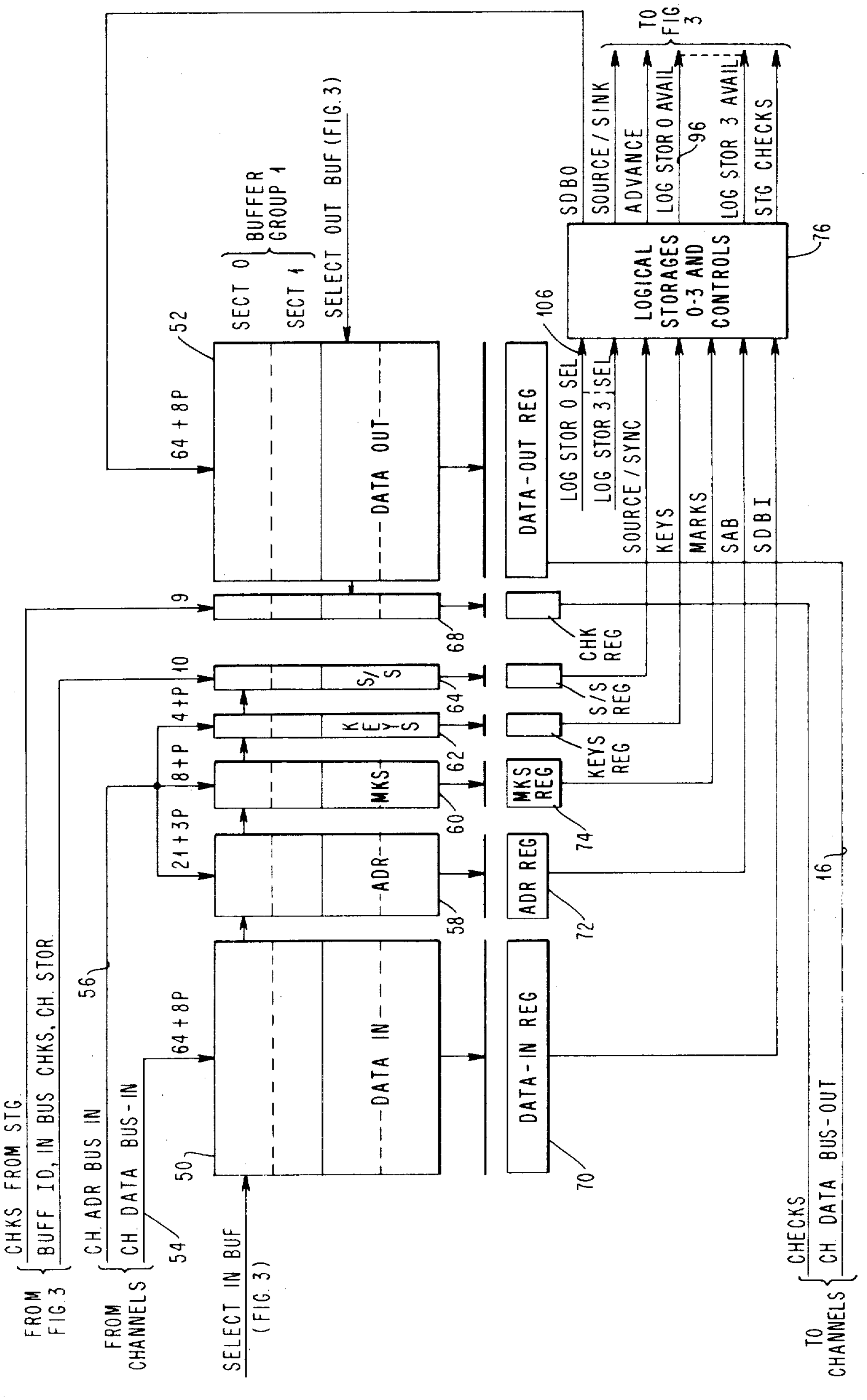
FIG. 2 is a block diagram of the dedicated buffers of the invention.

Channel Buffers (FIG. 2)

Each channel is assigned a buffer group. Each buffer group is divided into two sections, section 0 and section 1. For example, in FIG. 2, channel 1 is assigned buffer group 1 comprising sections 0 and 1 in both the data in portion 50 and the data out portion 52. The channel data bus in 54 is 9 bytes wide (8 bits per byte) and includes 8 parity bits. The common channel address bus in 56 feeds the address buffer portion 58, the marks portion 60, and the keys portion 62. The definitions of the channel lines are more fully described in U. S. Pat. No. 3,488,633 — Automatic Channel Apparatus — L. E. King et al., filed Apr. 6, 1964 and issued Jan. 6, 1970, and assigned to the assignee of the present invention.

A source sink (S/S) section 64 is provided which is described subsequently. Briefly, this register is used for channel buffer identification of the data requests to and from logical storage.

The data out portion of the buffers 52 is also 9 bytes wide and provides for buffering data out to the channel data bus out 16. Also, a buffer section 68 is provided for buffering the checks from the storage for subsequent transfer to the channel. The data in register 70 feeds the storage data bus in (SDBI), and the address register 72 feeds the storage address bus (SAB). These busses feed the main storage 76 which is an interleaved storage comprising four logical storages 0 – 3. Data from logical storages is placed on a common storage data bus out (SDBO) which feeds the channel buffer 52. Buffer 52 stores the requested output data in one of the dedicated buffer sections for subsequent transfer to the channel data bus out 16.

Channel In Bus Priority

Figure 3:
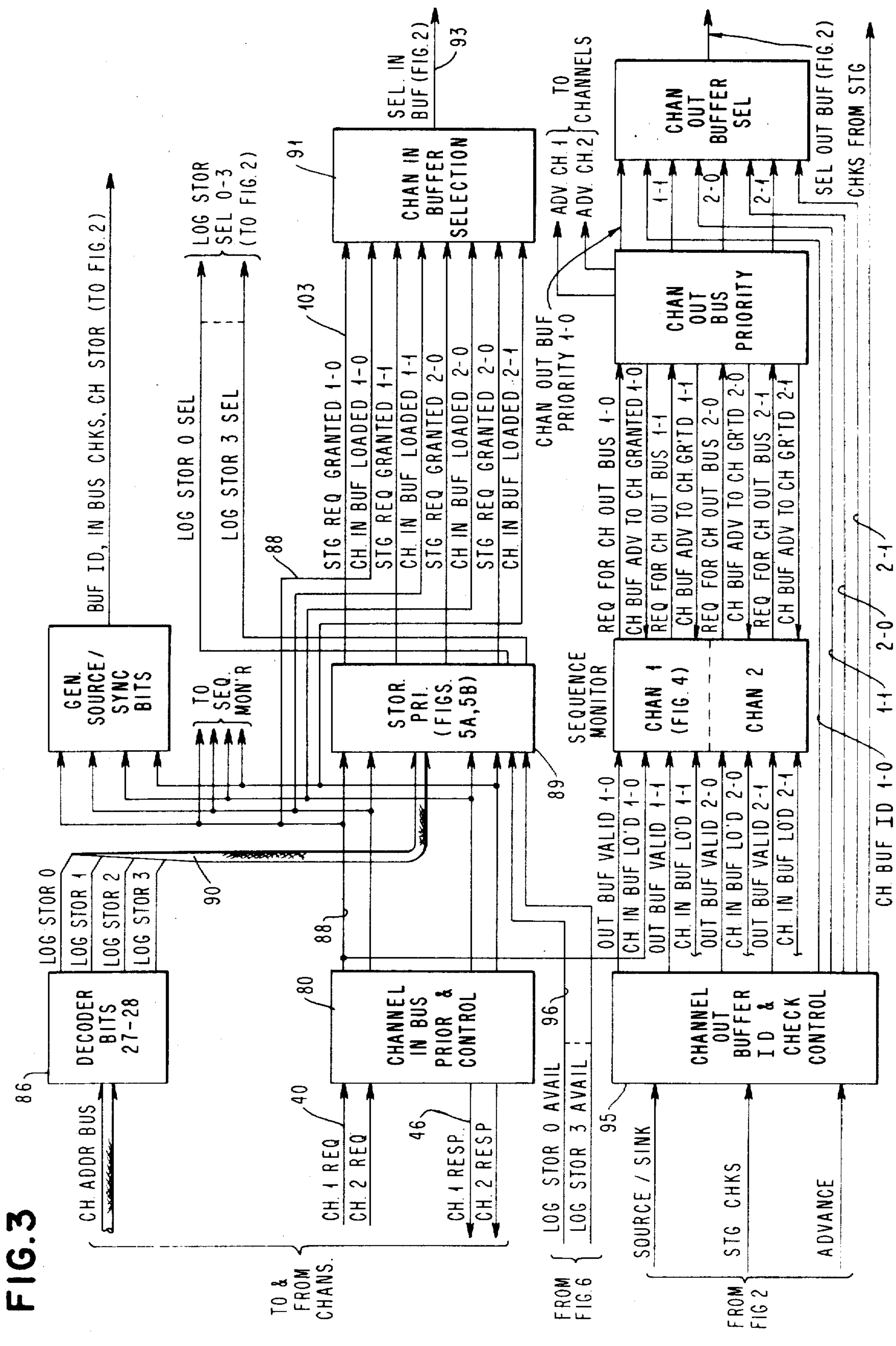
FIG. 3 is a block diagram of the in and out buffer controls.

Channel in bus priority is granted to one of the channels by means of channel in bus priority and control circuit 80 of FIG. 3 (this circuit includes priority circuit 22 shown in FIG. 1). In the embodiment shown, only two channels are considered and channel 1 has a higher priority than channel 2. For example, the channel request 40 enters the priority circuit 80. Since no other higher priority channel requests the data bus, priority is granted on the channel 1 response line 46. The request is placed in group 1, section 0 buffers of FIG. 2. The next request from channel 1 is placed in group 1, section 1. Subsequent requests from the same channel are placed in whichever section becomes non-busy first.

Figure 5A:
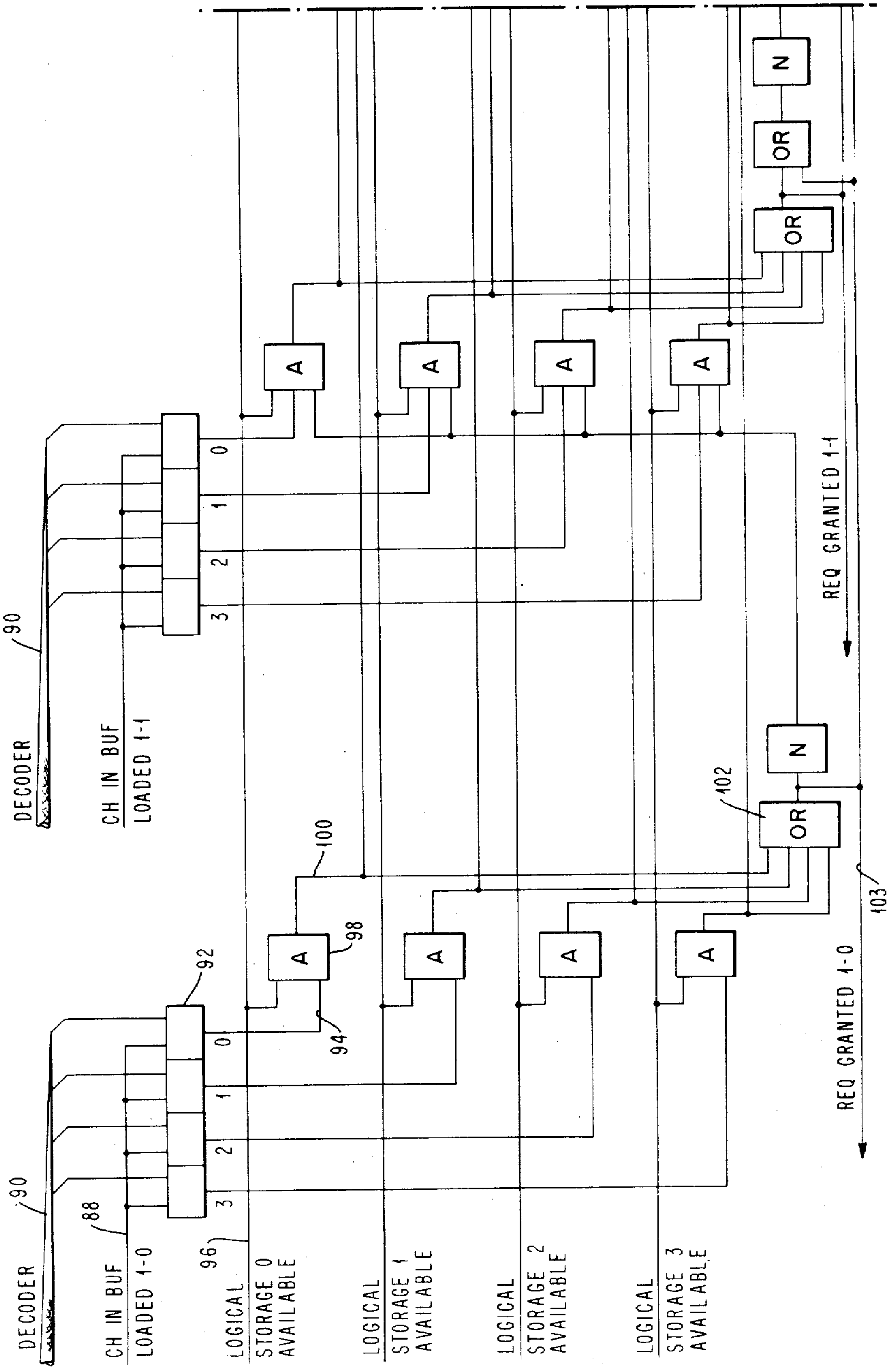
FIGS. 5A and 5B are a composite diagram of a priority circuit for use with the present invention.
Figure 5B:
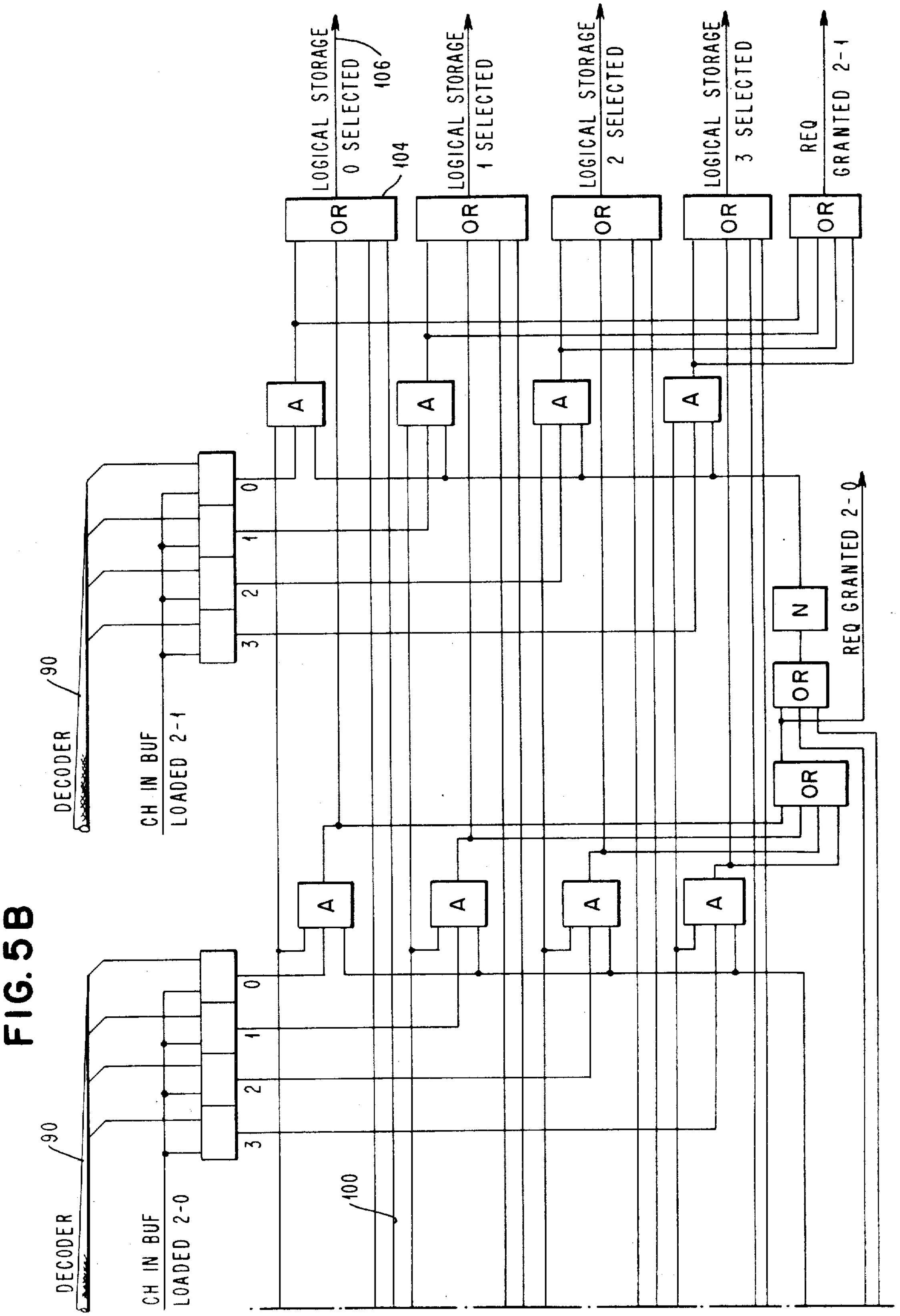

Storage Priority (FIGS. 5A, 5B)

The common channel address bus enters a decoder 86 (FIG. 3) which decodes bits 27 and 28. These bit positions indicate which logical storage 0 – 3 is to be selected by the address stored in register 58 (FIG. 2) in the buffer section corresponding to the request. One of the outputs (Log Stor 0 – 3) of the decoder 86 is energized indicating one of the logical storages.

The channel in bus priority circuit 80 provides one output corresponding to the channel buffer and the section of that buffer loaded by the pending request, for example, channel in buffer loaded 1 - 0 line 88.

The output 90 of the decoder 86 is brought into the storage priority circuit 89 shown in detail in FIGS. 5A, 5B. Assuming that channel in buffer loaded 1 - 0 line 88 is energized, a latch in register 92 (FIG. 5A) is turned on indicating the logical storage requested by this channel. Assume that logical storage 0 was decoded by the channel on the channel address bus. This causes the output 94 of register 92 to be energized. When the logical storage 0 becomes available, an output 96 (Log Store 0 Avail) is energized from logical storage controls 76 (FIG. 2). Therefore, when logical storage 0 is available, output 96 is energized which causes the AND circuit 98 in FIG. 5A to generate an output 100. The output 100 energizes OR circuit 102, the output 103 of which is request granted 1 - 0, meaning that the channel 1 request stored in section 0 can now access logical storage.

The output 100 also energizes OR circuit 104 (FIG. 5B) to cause logical storage 0 selected output 106 to be energized.

Referring to FIG. 2, the logical storage 0 selected output 106 selects the logical storage within the logical storage block 76.

Channel In Buffer Selection

As described above, an output 103 from the storage priority circuit 89 results when the logical storage becomes available for this highest priority request. The storage request granted 1 - 0 line 103 enters channel in buffer selection logic 91. In addition, the channel in buffer loaded line 88 enters this logic. Thus, when the request is granted for section 0, and if section 0 is loaded, then the channel in buffer selection logic 91 energizes an appropriate output 93 which selects the section 0 of buffer group 1 (FIG. 2). As different buffer sections are selected by the priority circuits, the logic 91 moves the pointer 93 to gate the information into the appropriate sections shown in FIG. 2. The data on the SDBI is stored in the address pointed to by the address on the SAB.

In summary, one of the channel requests is granted priority by the channel in bus priority circuit 80 and enters into the storage priority circuit 89. The request for logical storage is granted by this circuit taking into consideration whether or not the logical storage is available. Once the request is granted, the channel in buffer selection circuit 91 responds by energizing an appropriate output 93 to select the appropriate in buffer section for transfer to the storage.

Channel Out Buffer Control

If the channel request is for a data transfer from storage to the channel, then the data from the logical storage 76 (FIG. 2) is stored in the appropriate section of the buffer group in the data out portion of the channel buffer 52. The data requested from the logical store is placed on the storage data bus out (SDBO) along with the source sink data. The source sink data enters the channel out buffer ID and check control logic 95 (FIG. 3). The source sink data identifies the information and this results in an output from the logic 95 out buffer valid 1 - 0 which indicates that output data has been stored in section 0 of buffer group 1 which corresponds to the request received from channel 1. The use of source sink data to control fetch and store requests is well known in the data processing art. See, for example, U. S. Pat. No. 3,462,744, Execution Unit With A Common Operand And Resulting Bussing System, Tomasulo et al., filed Sept. 28, 1966 and issued Aug. 19, 1969.

Figure 4:
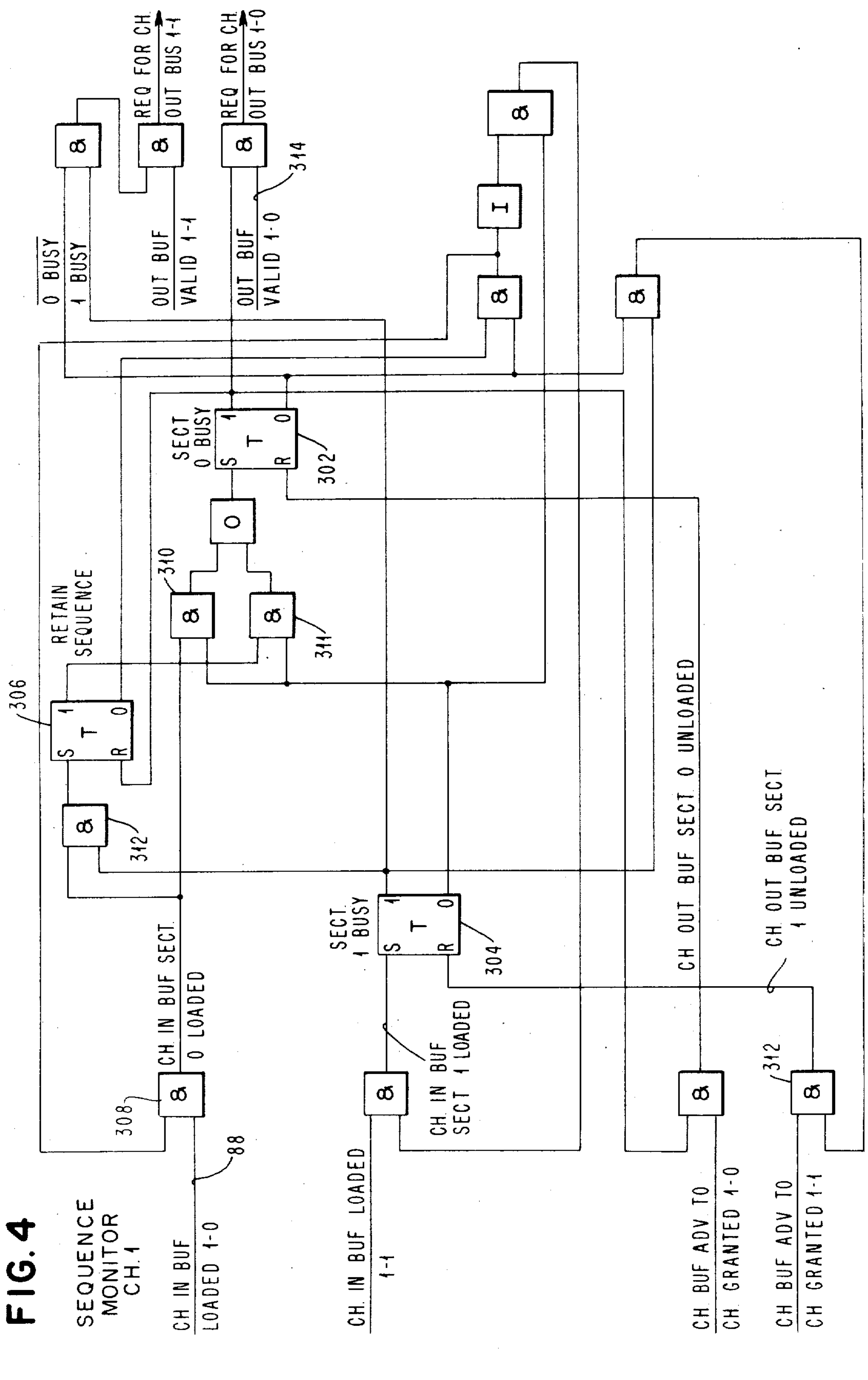
FIG. 4 is a logic diagram of a sequence monitor for controlling the sequence of loading and unloading the channel buffers of FIG. 2.

Sequence Monitor (FIG. 4)

The channel in buffers 50, 58, 60, 62 and 64 of FIG. 2 are independent of the channel out buffers 52. In order to achieve maximum control efficiency, the sampling of a channel's request information into the in buffers and the out-gating of the contents of the channel out buffer to the channel are both a function of a sequence monitor shown in FIG. 4.

The sequence monitor is comprised of a section 0 busy latch 302 and a section 1 busy latch 304 and a retain sequence latch 306 for each channel buffer group. Thus, in the embodiment shown, FIG. 4 is duplicated for channel 2. Once a channel's request receives priority for use of the channel in bus, the channel in buffer loaded 1 - 0 line 88 is energized. This causes an output from AND circuit 308 to turn on the section 0 busy trigger 302. A section busy latch remains active until the storage is cycled for that request and the channel is so notified by energization of the advance channel line (FIG. 3). The three triggers 302, 304 and 306 are used to control the sequence in which the buffer sections of FIG. 2 are loaded and unloaded.

A detailed description of the state of the sequence monitor under possible section busy conditions is given below. For each case, the parameters for loading the channel in buffers are the same as those used for unloading the channel out buffers.

Loading of Channel In Buffers

Case I Section 0 and Section 1 are Non-Busy — The sequence monitor directs the channel request to be loaded into section 0 and activates section 0's busy latch 302. Section 1's busy latch 304 remains off.

Case II Section 0 Busy, Section 1 Non-Busy — The monitor recognizes sections 1's availability. The request is loaded into section 1 and section 1's busy latch 304 is activated. Section 0 and section 1 busy latches are now active.

Case III Section 0 and Section 1 Busy — The sequence monitor inhibits this channel request from contending for Chan In Bus priority.

Case IV Section 0 Non-Busy, Section 1 Busy — The monitor directs the channel request into section 0, however, section 0's busy latch is not activated because AND 310 is de-energized. Instead, the retain sequence trigger 306 is activated (AND 312 is energized). Section 1's busy latch 304 is not affected.

Case V Retain Sequence Trigger On, Section 1 Busy — The sequence monitor exercises the same inhibiting function as in Case III. After section 1's sequence is completed and the section 1 busy latch reset via AND 302, section 0's busy latch is activated via AND 311 causing the retain sequence trigger to be reset.

The storage address contained in each section of the Channel In Buffer is decoded to determine the logical storage the request seeks to access. Each channel buffer vies for storage priority independently. The time required to ingate storage data, for the channel's request, into the Channel Out Buffer section, is dependent upon other channel interference, CPU interference and the interleaving of the storages. Therefore, the controls for loading the Chan Out Buffer are independent of the controls for loading of the Chan In Buffer.

A Channel Out Buffer section 0 or 1 is considered valid during the elapsed time from the ingating of information from storage, into the section, to when the outgating of data, to the channel, from that buffer section occurs.

Unloading of Channel Out Buffer Sections

Case I Section 0 and Section 1 are Non-Busy — This parameter is not applicable to the outbound sequence.

Case II Section 0 Busy, Section 1 Non-Busy — Upon the validation of section 0 (Out Buf valid 1 - 0 line 314), the sequence monitor allows section 0 to contend for priority for use of the Channel Out Bus. After priority is granted to section 0, and the data is gated to the channel, Ch Buf Adv to Ch granted 1 - 0 line 316 is energized and section 0's latch is reset.

Case III Section 0 and Section 1 Busy — The sequence monitor is pointing to section 0. Once section 0 is validated, it immediately contends for priority for the Channel Out Bus. Section 1 may be validated before or after section O. However, the sequence monitor inhibits section 1 from contending for Chan Out Bus priority until section 0 has completed its transmission to the channel and section 0's busy latch is reset. After section 1 completes its transmission, its busy latch is also reset.

Case IV Retain Sequence Trigger On, Section 1 Busy — The sequence in which section 0 and section 1 may be validated is random. However, the sequence monitor will buffer section 0 from the Chan Out Bus priority until section 1 has completed its transfer to the channel and section 1's busy latch is reset. After resetting section 1's busy latch, section 0's busy latch is activated, causing the retain sequence trigger to be reset. The sequence monitor now allows section 0's validated request to vie for priority for the Chan Out Bus. Upon completion of priority and the transfer to the channel, section 0's busy latch is reset.

DETAILED DESCRIPTION OF CONTROLS

Referring now to FIGS. 6A - 6E, the controls for the storage control unit (SCU) of FIGS. 1 - 6 are described by means of a flow chart. The nomenclature is as follows. The chart refers to any channel *n*. Channel *n* is assigned to buffer groups *n; x* refers to a buffer group section 0 or 1. A trigger or latch designated *nx* refers to buffer group *n*, section *x* designating the channel buffer section. If a particular trigger or latch is common to a buffer group, it is designated *n*.

At block 200 the channel *n* issues a request. This request is sent to the SCU and since it is asynchronous with the SCU clocks, at block 201 the request is set into a sync trigger, a trigger that has been allocated for this request. (The control logic per se is not shown, however, this can be supplied by one having ordinary skill in the art.) This request then is set into a channel buffer request latch 203. Decision logic 204 determines if this request is for section 1 of the *n* channel buffer group. If the decision is yes, the logic proceeds to block 205. The decision in block 205 is whether or not both sections of the buffer 1-0 and 1-1 are busy. If they are both busy, the logic cannot proceed. However, if one or the other of the buffer sections is not busy, request *n* contends for in bus priority at block 207.

Referring again to block 204, if the decision was that request *n* is not for section 1 of the buffer group, the logic proceeds to decision block 206. Decision block 206 decides that, if this request is for section 1, is section 1 busy. If yes, section 1 is busy, then the logic waits until section 1 becomes not busy. If no, section 1 is not busy, the logic proceeds to decision block 207 which then allows this request to vie for priority on the in bus. Once the logic has initiated a request for the in bus, determine via block 208 if this particular request has highest priority of all the outstanding requests. If it does not, then this request remains in contention for priority until it is the highest priority contender. If this request is the highest priority contender, then proceed to block 209. In decision block 209, if in bus busy latch is on, the in bus is being presently used by some other channel. If yes, the in bus is busy with some other channel, wait until the in bus is no longer busy. Determine if the in bus is no longer busy by the fact that in block 210, address valid latch A is on. When this latch is turned on, the request that has been serviced over the in bus is through with the in bus. Proceed to decision block 211.

On block 211, set a response trigger *nx*. This response is sent to channel *n* to indicate to the channel that it now has been allocated priority for the channel in bus and it may now put its data and address the in bus. From block 211, proceed to 212 where in the SCU a bus busy latch is set. This latch inhibits any other channel from getting use of the bus until this operation is completed. In block 213, a group response latch *x* is set. This group response latch is used to reset the channel request sync trigger which was set in decision 201. The channel buffer request latch is turned off in block 215. This request latch was turned on in decision 203. In effect, the logic has prevented this one request which was received from the channel from re-entering the priority network. In block 216, response to channel *n* is raised. At block 217, the channel responds to the response line and pulses the in busses and the address valid signal. The address and data are then gated onto the in bus. In block 218 the address valid line from the channel turns on address valid sync flip-flop for synchronizing with the SCU clock system.

Figure 6A:
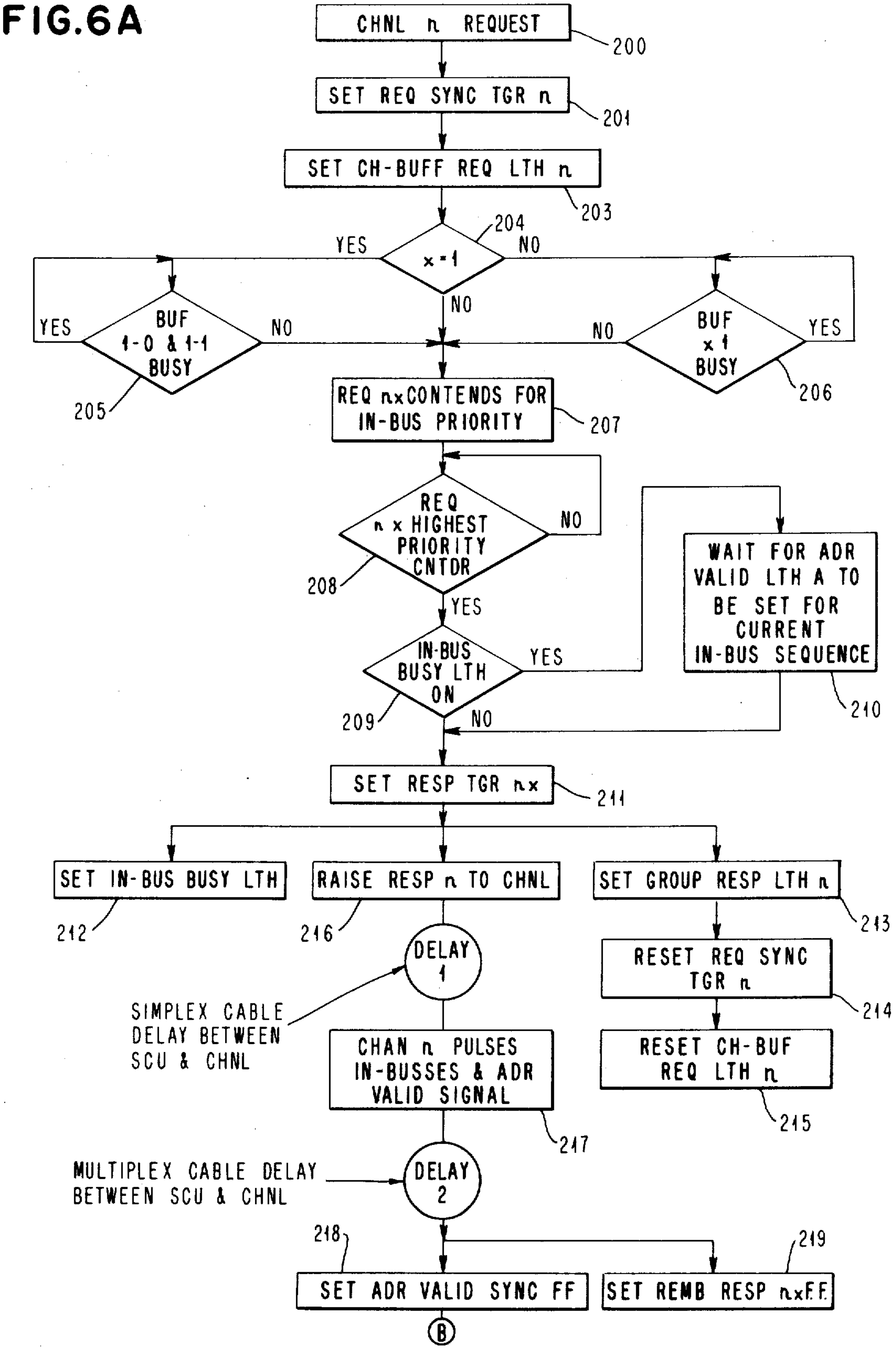
FIGS. 6A – 6E comprise a flow chart of control for the invention described in the foregoing figures.
Figure 6B:
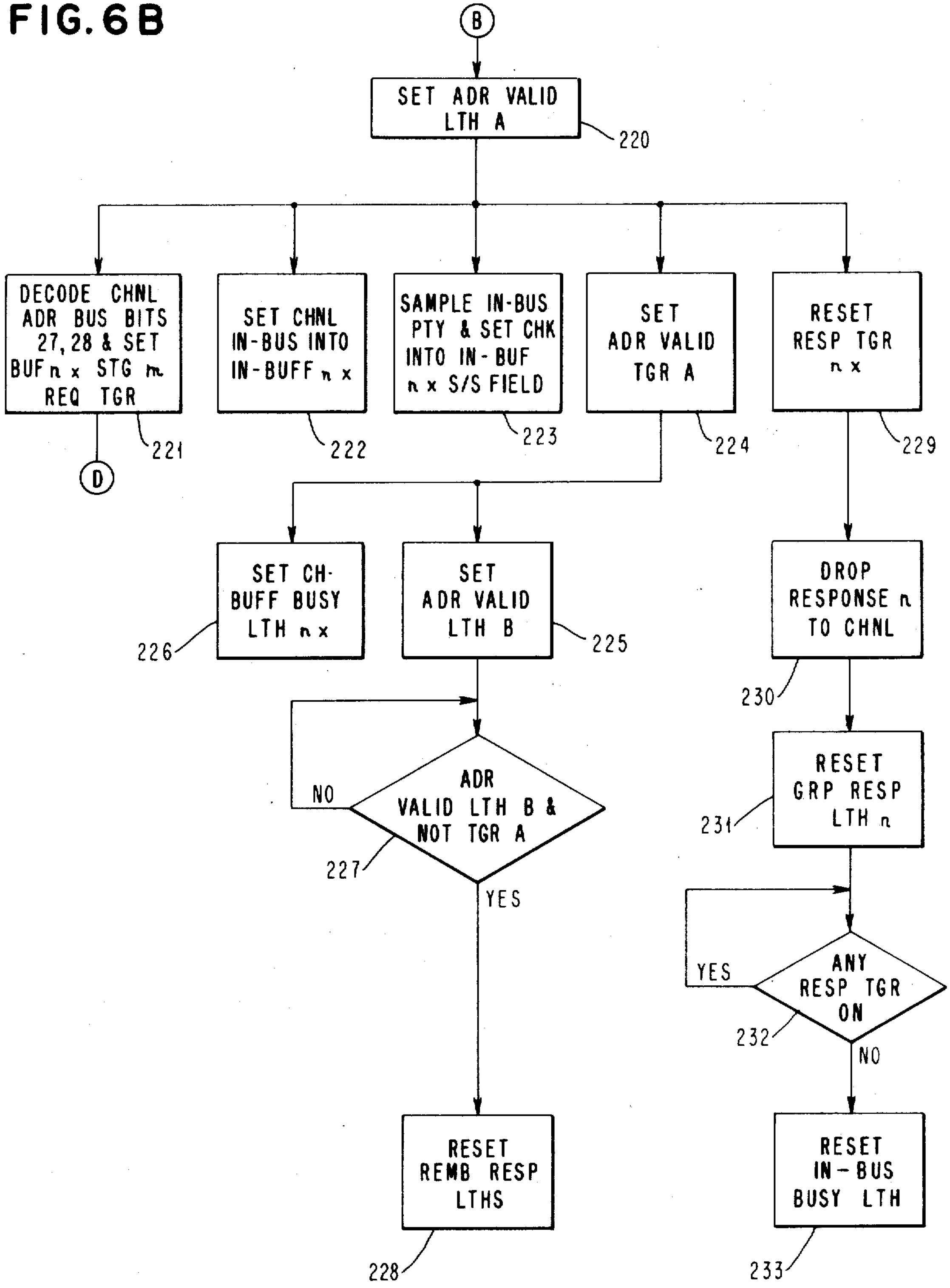
Figure 6C:
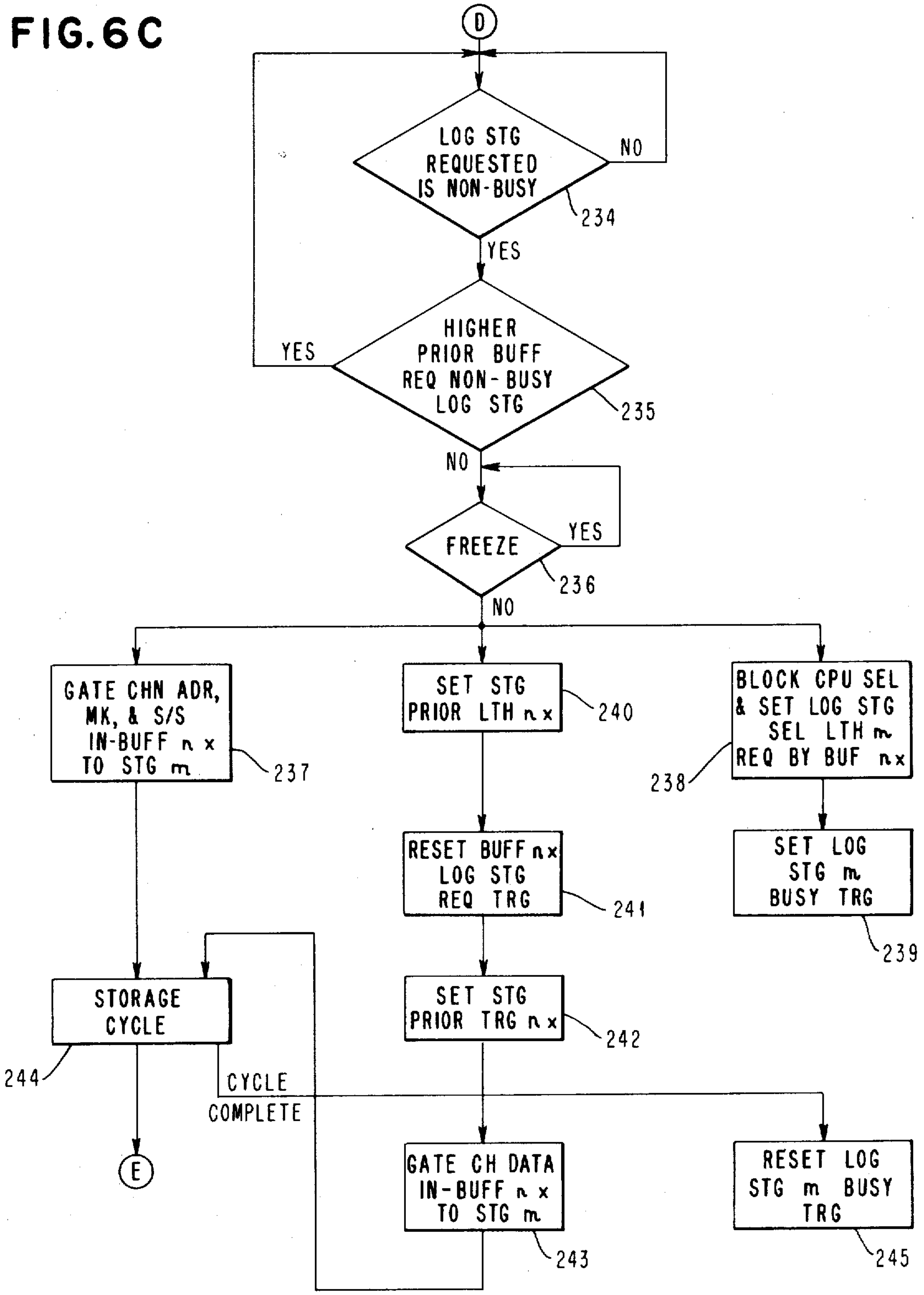

Simultaneously, in block 219, remember response flip-flop is turned on. The function of this flip-flop is to remember to which channel the response 216 was sent. Referring now to FIG. 6B, in block 220, the address valid flip-flop which was set in block 218 is used to synchronize the SCU by setting address valid latch A. Address valid latch A turns on at a predictable time with respect to the SCU clocks whereas in block 218, the flip-flop can turn on any time in the SCU clock cycle.

Proceeding from block 220, several internal housekeeping tasks are taken care of. In block 221, channel address bus bits 27 and 28 are decoded in order to determine which logical storage is selected. This decoder is shown in the FIG. 3 logic diagram. In block 222, sample the data, the address, the keys and the marks that are on the in bus and ingate this data into the appropriate channel buffer section. In block 223, a check is made to see if any of the data on the in bus has a parity error. If parity checks are detected, that information is loaded into the in buffer. At the same time, the source/sink field is set up. The information generated for the source/sink field is the channel identification (ID). The same buffer section into which data is loaded has that ID loaded into the ID buffer. When this request is serviced by storage, the request is identified via the source/sink bits.

In block 224, set address valid trigger A which feeds an address valid latch B at block 215 and also set channel buffer busy latch 226 in the sequence monitor (FIG. 4). The address valid latch B is just a pipeline chaining used in the controls in order to maintain the correct timing sequence.

Proceed to decision block 227: is address valid latch B on and trigger A off? This is an internal timing control which, if yes, causes the logic to reset the remember response latch block 228. The remember response latch was turned on in blocks 219 (FIG. 6A). At the same time that the functions that are shown in blocks 221, 222, 223, 224 are executed, the controls in block 229 reset the response trigger. This de-energizes the response line 230 to the channel. Then reset the group response latch block 231. After resetting this latch, at decision block 232, determine if another response trigger has been turned on. If none of the response triggers are turned on, then reset the in bus busy latch block 233 and allow any channel that may want activity on the bus to get access to the bus. If any response trigger is on, do not reset the in bus busy latch. This condition exists when some other request is waiting to get response and as soon as channel *n* dropped response, the other channel turns response right back on again. Therefore, there is no need to turn off the in bus busy latch because the in bus is immediately busy again.

Referring again to block 221, FIG. 6B, address bits 27 and 28 are decoded to determine which logical storage is selected by the channel request. Proceed to the decision block 234: is the requested logical storage busy? If it is busy, wait until it becomes non-busy. However, if it is not busy, proceed to decision block 235. This is the storage priority 89, FIG. 3. Is there any other channel buffer request that is in contention for this logical storage that has a higher priority than our request. If there is a request of higher priority, the logic loops back to block 234. However, if there is no other request or if the requests outstanding are of a lower priority than request *n*, then proceed to block 236 (freeze). Freeze is a function which is generated during the time when storage is sending data to the SCU. A high speed buffer may be used with the present invention. This has not been shown in the present embodiment. When a high speed buffer is present, there is a common bus which is shared between the channels and the main storage data out register. If the channel is sending data to the high speed buffer, that data is on this common bus. Only one channel can gate data on this bus, otherwise there would be an ORing effect of the two sets of data. Since a storage cycle cannot be stopped once it has begun, storage data goes on the bus and the channel is inhibited by the freeze from out gating its data onto the bus until the storage has completed its utilization of the bus. Once the freeze line has been turned off, then proceed to the logical storage handlers.

In block 237, gate the channel address, the marks, and the source/sink from the in buffer to the storage data bus in (SDBI). At the same time, in block 238, inhibit the CPU from selecting that particular logical storage. The CPU has separate priority circuits (not shown in FIGS. 1 – 5) for storage different from the ones of the channel. Since the channel has higher priority, once the channel has selected a logical storage, a line is sent over to the CPU priority circuits inhibiting the CPU from selecting that particular logical storage unit. Then set a logical storage busy trigger for the selected storage *m*. This storage busy trigger is set in block 239. The function of this storage busy trigger is to inhibit another channel or the CPU from selecting this logical storage unit.

During the same interval of time that the logic is executing blocks 237 and 238, the logic is executing block 240. In block 240 the logic sets the storage priority latch for the particular buffer section. This latch is used to reset the request for logical storage that was initially turned on in block 221. This resetting function is done in block 241.

Next, in block 242, set a storage priority trigger. This storage priority trigger is used to select the buffer section *x* corresponding to the request and to out gate the data and send the data for this operation to storage. This is done in block 243. In block 237, which was previously discussed, the address, the marks, and the source/sink were sent to storage. At that time the controls did not send the data. There is a difference in timing from the time the data is sent and the time the other control information is sent.

At this time, the logic is in the storage cycle shown in block 244. After completing the storage cycle, the storage busy trigger is reset at block 245. Resetting this trigger allows either another channel or the CPU to access this particular logical storage unit *m*. This trigger was set in block 239.

Figure 6D:
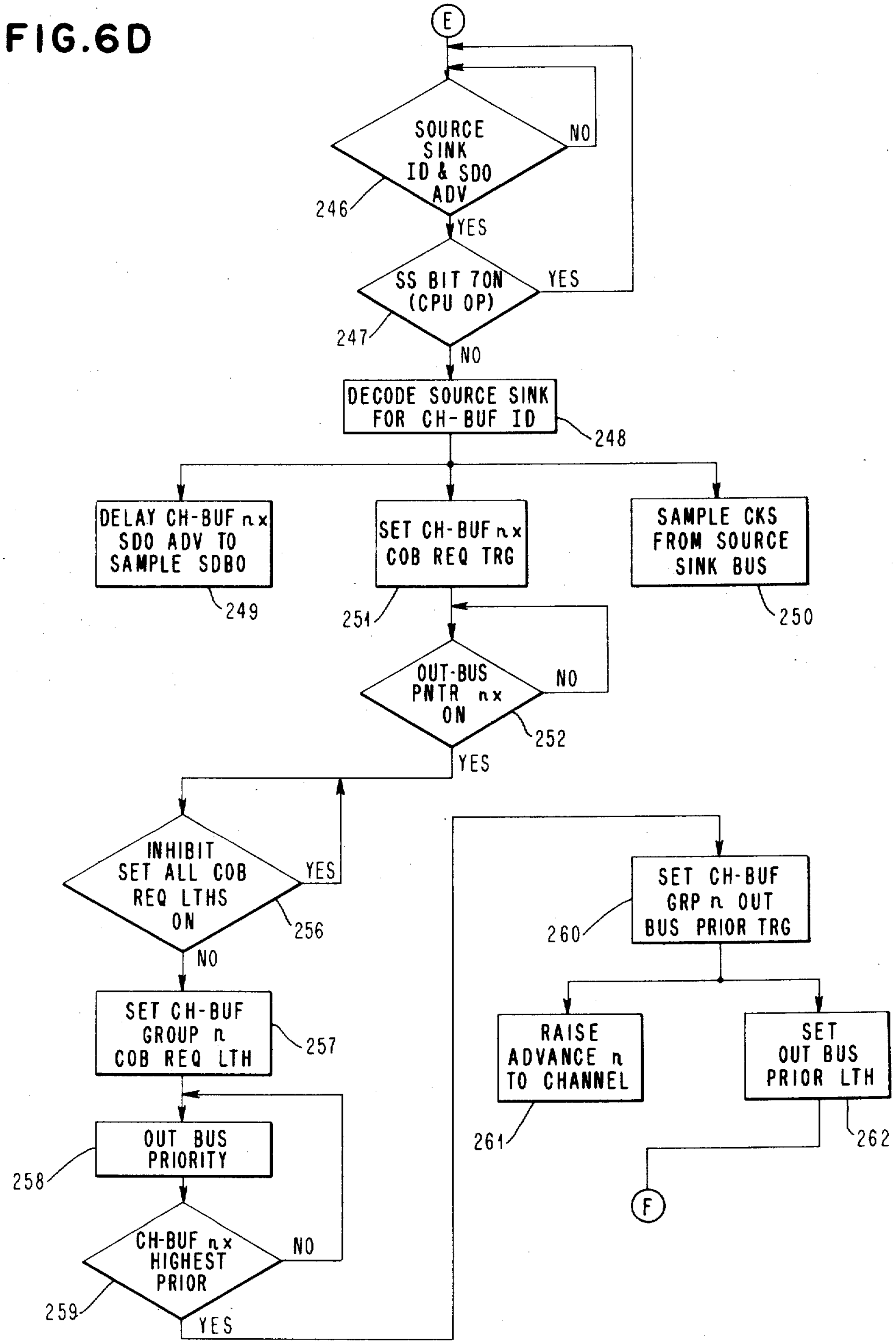
Figure 6E:
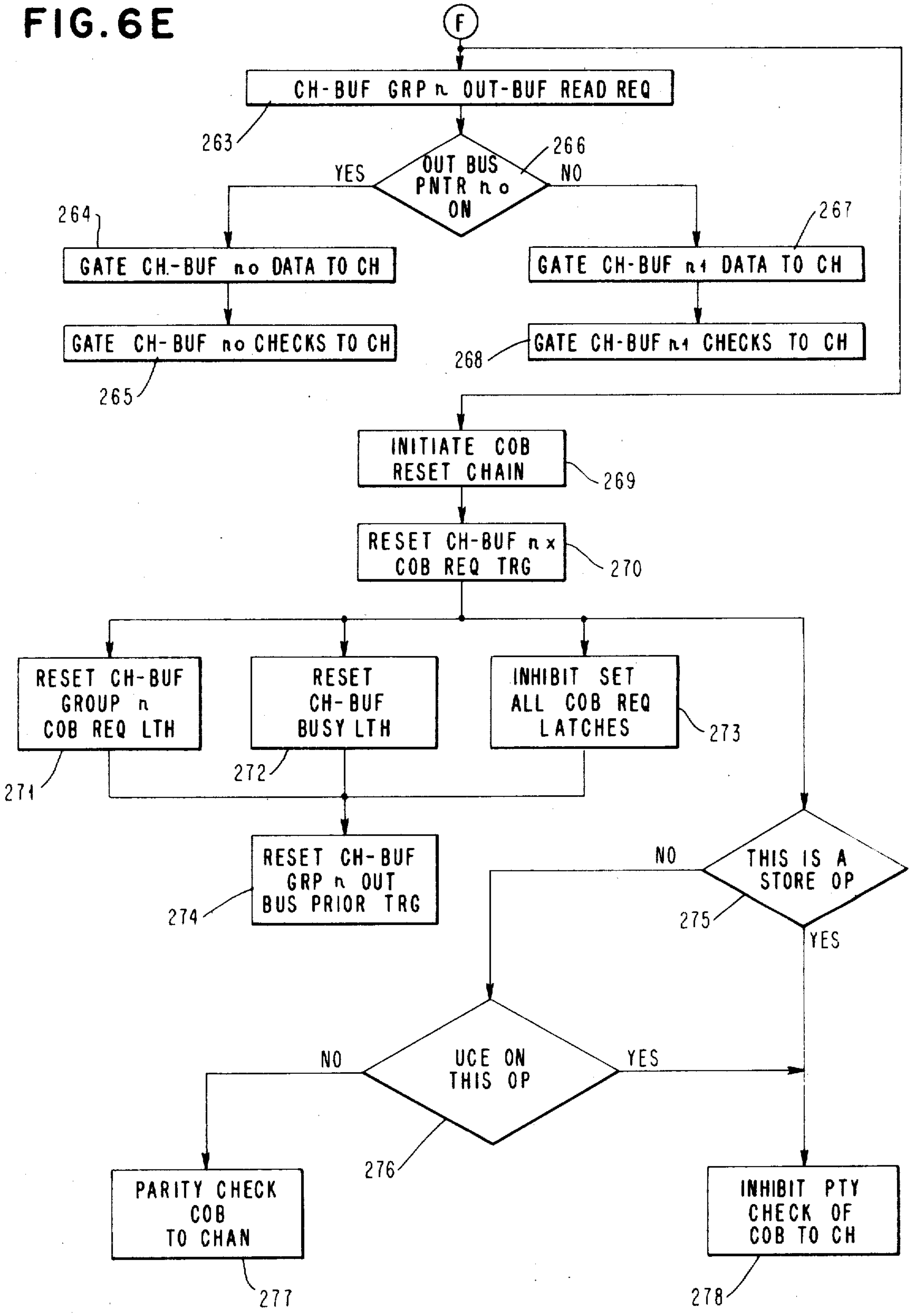

Referring to FIG. 6E, the outbound sequence of the channel buffer control area is described. Block 246 examines the source/sink ID bits and the storage data out (SDD) advance received from the storage unit. Then determine if this particular storage operation is for the channel or for the CPU at block 247. If source/sink bit 7 is on, this indicates that the advance just received is for a CPU operation and it is disregarded. If source/sink bit 7 is on, this indicates that the advance just received is for a CPU operation and it is disregarded. If source/sink bit 7 is off, then at block 248 decode the source/sinkbit in order to determine for which channel buffer section this request is intended. Since the advance received from storage arrives in the SCU two cycles before the data, the advance is delayed via a trigger latch combination block 249 for two cycles. This delayed advance is used to sample the data that arrives into the SCU. At the same time that the advance is being delayed, block 250 examines the source/sink bits which were received from storage to see if there are any checks that have been detected during this operation.

In block 251, set a channel out buffer COB request trigger for this particular request. Each buffer section has dedicated to it a channel out buffer request trigger. Proceed to block 252 which determines where the out buffer pointer (FIG. 2) is pointing to. The out bus pointer is a function of the sequence monitor and in effect, determines if the request for channel *n* is the first one that was received at the SCU. The first-in first-out (FIFO) sequence monitor is shown in FIG. 4 of the data flow. If the sequence monitor indicates that this request is the first one received in the SCU, then proceed to block 256. In order to inhibit the overrunning of the outbound sequence, logic described subsequently (block 273, FIG. 6E) inhibits the setting of the out bus request latches. If block 256 is yes, this request is not allowed to continue, but waits until the out bus is no longer busy. Once the out bus is no longer busy, proceed to function block 257. Set channel buffer group request latch. This is the request that vies for priority for the out bus. Block 258 shows the out bus priority. If channel buffer group *n* does not have highest priority, it must wait and will honor that group which has the highest priority. If it does have the highest priority, which would be determined in decision block 259, then set channel buffer group out bus priority trigger block 260. The priority trigger, when on, indicates that this group *n* has received priority for the out bus.

Once the out bus priority trigger is on, then raise advance to channel *n* (block 261). This notifies the channel to expect data on the channel out bus. At the same time that the advance is raised, turn on the out bus priority latch 262. This out bus priority latch is used in the internal controls.

Referring to FIG. 6E, proceed to block 263 which turns on channel out buffer read request. In block 266, determine if the data is to be gated from the channel out buffer section 1 or from section 0. We do this by looking at the out bus pointer. If out bus 0 pointer is on, then proceed to block 264 which gates the channel buffer section 0 data to the channel. In block 265, gate any checks that have been associated with this request to the channel. These checks are stored in the out buffer for section 0. If decision block 266 indicates pointing to section 1, then out gate the data from section 1 of channel *n* shown in block 267. The checks associated with this request which are located in section 1 of the out buffer are also sent to the channel (block 268).

At this point all data and checks have been sent to the channel. Proceed to block 269 which initiates the channel out buffer reset chain. This chain consists of a series of triggers and latches used to reset the different requests and control lines that have been turned on earlier in the sequence. The first trigger turned off is the channel out bus request trigger (block 270). The turning on of the channel out buffer request trigger was shown on functional block 251 (FIG. 6D).

Three functions are reset during the same time interval, those are blocks 271, 272 and 273. In block 271 reset the channel buffer group *n* request latch. This was the request latch which was used to vie for priority in the priority circuits and was turned on in functional block 257 (FIG. 6D). In block 272 reset channel buffer busy latch. The busy latch was set in functional block 226 (FIG. 6B). These busy latches again refer to the sequence monitor as shown in FIG. 4 of the data flow. In block 273 inhibit the setting of any channel out buffer request. In effect, this prevents another request from interfering with the sequence monitor. This inhibit function is the function that affected decision block 256 described previously (FIG. 6D). After completing functions 271, 272 and 273, then reset the out bus priority trigger block 274. This is the trigger that was turned on once priority had been granted to the out bus. This priority trigger was turned on in functional block 260 (FIG. 6D).

Previously in describing the outbound sequence, blocks 264, 265, 267 and 268, it was indicated that the data is sent to the channel during one interval time and the checks are sent at a later interval *mf* time. The reason for this is shown in decision blocks 275–278. Decision block 275 indicates a channel fetch (no) or store (yes) operation. If the channel is storing into main storage, then the data being sent to the channel is not used by the channel and there is no reason to check that data to see if there is any bad parity on the out bus to the channel. However, if the channel is fetching from main storage, then the data that is being sent to the channel is the data that the channel plans to use. Therefore, activate the checking circuits. The fact that the data are being checked indicates that the checks have to be sent at some later time and that is the reason for the delay shown in 264–268. If in decision block 275 the decision is yes it is a store operation; proceed to block 278 which inhibits parity check for channel out bus to channel. However, if in decision block 275 the decision is no, this is a fetch operation. The logic block 276 determines if during this fetch operation an uncorrectable error was detected in storage. If storage detected an error in the data, that same error occurs in the channel buffer and that error is not sent to the channels. Therefore, the channels are not informed that an error was detected in the channel buffers when, in fact, the error was from the storage unit. If an uncorrectable error (UCE) is detected from storage, the data that is sent to the channel is not checked. If no uncorrectable error, decision block 276 then proceeds to 277 which checks to see if good parity exists on the bus for the data being sent to the channel. The checking of the data is the last function that is executed for this request *n*. This completes one operation through the channel buffer area.

While the invention has been particularly shown and described with reference to a preferred embodiment thereof, it will be understood by those skilled in the art that various changes in form and details may be made therein without departing from the spirit and scope of the invention.

What is claimed is:

1. An input/output control system for controlling access to an interleaved memory divided into logical memory areas, comprising:
   a plurality of channels, each assigned a rank in a priority ranking order;
   a plurality of buffers at least one buffer for each channel, including means for storing requests comprising data and addresses of memory locations at which said data are to be stored;
   priority determining means responsive to addresses stored in said buffers for granting requests to an available one of said logical memory in the priority order said request holds in the ranking order with respect to requests by other channels in said order for the same memory.

2. The combination according to claim 1 including priority means for granting priority to one of said channels at a time to access a common bus for transmitting said data and addresses to said buffers.

3. The combination according to claim 1 wherein said buffers comprise a predetermined number of buffers specifically dedicated to each channel; and including sequence monitor means for controlling the sequence of loading said predetermined number of said buffers specifically dedicated to a channel such that said buffers are loaded as they become available to said channel.

4. The combination according to claim 3 above wherein said plurality of buffers includes input buffers and output buffers and said sequence monitor includes means for maintaining a sequence of unloading said output buffers to said channel which sequence is the same sequence that said input buffers are loaded with said requests from said channel.

5. An input/output control system for controlling access to a memory having a plurality of independently accessible memory modules, comprising:
   means for selecting the module to which a given access request is made;
   means for indicating if said selected module is busy to said access request;
   a plurality of data channels having the capability of requesting access to said memory, said channels arranged in a priority order;
   a plurality of buffers, a predetermined number of said buffers specifically dedicated to each channel;
   a common bus interconnecting said channels and said buffers; and
   means responsive to manifestations corresponding to requests from said channels stored in said buffers, said manifestations corresponding to requests to access the same non-busy memory module, for granting access according to channel priority as among only those channels having requests pending for the same non-busy memory module.

6. The combination according to claim 5 including priority means for granting priority to one of said channels at a time to access a common bus for transmitting said manifestations to said buffers.

7. The combination according to claim 5 including sequence monitor means for controlling the sequence of loading said predetermined number of said buffers specifically dedicated to a channel such that said buffers are loaded as they become available to said channel.

8. The combination according to claim 7 above wherein said plurality of buffers includes input buffers and output buffers and said sequence monitor includes means for maintaining a sequence of unloading said output buffers to said channel which sequence is the same sequence that said input buffers are loaded with said manifestations corresponding to requests from said channel.

9. For use in a system in which a plurality of users contend for a plurality of utilization devices, a priority circuit for resolving a plurality of said requests to use said utilization devices, in parallel comprising:
   means for individually indicating the availability of said utilization devices;
   means for registering manifestations of requests from each of said contenders, each of said registering means including means for indicating the utilization device desired; and
   means responsive to said means for indicating the utilization device desired and to said availability signal for granting access to said device when said device becomes available and for not granting said request if manifestation of a request from a contender having a higher priority and for the same utilization device is registered in said registering means.

* * * * *